No. 816,768. PATENTED APR. 3, 1906.
J. S. YOUNG.
STONE CUTTING SAW.
APPLICATION FILED NOV. 11, 1905.
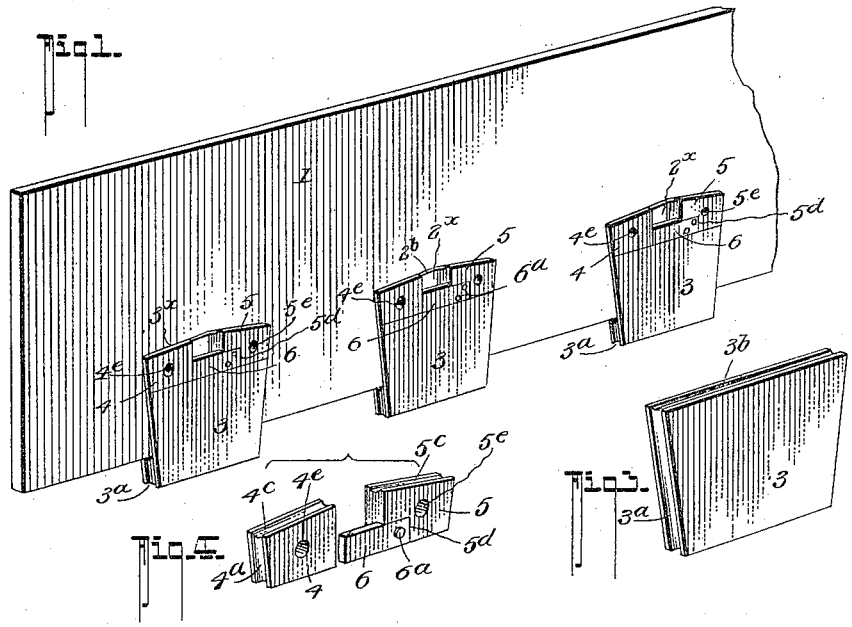
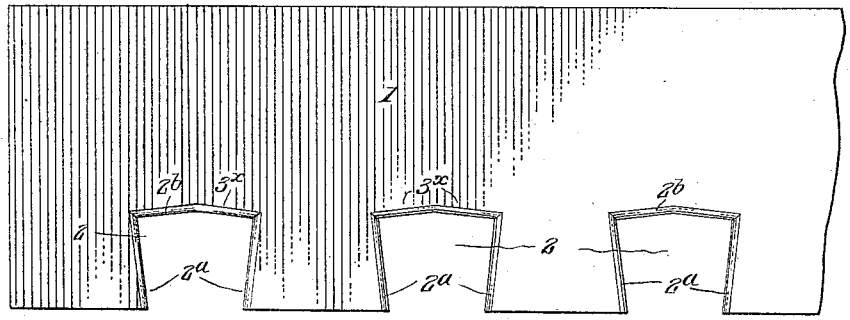
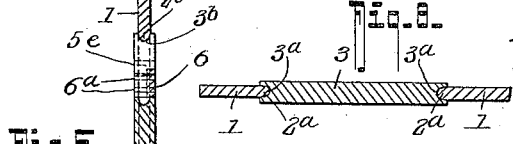
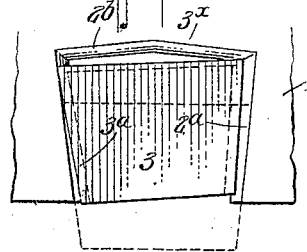
WITNESSES:
John T. Schrott,
F. C. Gibson.
INVENTOR
James Sylvester Young
BY
Fred G. Dieterich & Co.
ATTORNEYS.

UNITED STATES PATENT OFFICE.

JAMES SYLVESTER YOUNG, OF BETHEL, VERMONT, ASSIGNOR TO HARRIET M. YOUNG, TRUSTEE FOR MAURICE D. YOUNG.

STONE-CUTTING SAW.

No. 816,768.      Specification of Letters Patent.      Patented April 3, 1906.

Application filed November 11, 1905. Serial No. 286,874.

*To all whom it may concern:*

Be it known that I, JAMES SYLVESTER YOUNG, residing in Bethel, in the county of Windsor and State of Vermont, have invented certain new and useful Improvements in Stone-Cutting Saws, of which the following is a specification.

My invention relates to certain new and useful improvements in stone-cutting saws and the like; and it more particularly relates to improvements in insertible-tooth saws, in which means are provided for removably securing the tooth to the blade, so it can be removed at will to change teeth whenever it may be found desirable to do so.

Generically my invention includes a saw-blade having dovetailed recesses in its edge into which the saw-teeth are inserted, such teeth and saw-recesses having groove-and-tongue connection on their adjacent faces and wedge devices inserted in the recesses for locking the teeth in place, such wedges having tongue-and-groove connection with the blade and with the tooth.

The invention also includes spring devices for holding the wedges in place.

In its more specific nature the invention comprises certain novel construction, combination, and arrangement of parts, all of which will be hereinafter first fully explained in detail and then be specifically pointed out in the appended claims.

My invention primarily has for its object to provide a saw of the aforementioned character of a very simple and effective construction and in which the teeth can be readily inserted or removed and in which the inserted teeth can be firmly and positively locked in place.

Referring now to the accompanying drawings, in which like numerals of reference indicate like parts in all of the figures, Figure 1 is a perspective view of a blade embodying my invention. Fig. 2 is a side elevation of the blade without the teeth. Fig. 3 is a perspective view of a tooth. Fig. 4 is a perspective view of the wedge-locks. Fig. 5 is a vertical longitudinal section of a portion of the blade. Fig. 6 is a vertical cross-section on the line 6 6 of Fig. 5. Fig. 7 is a cross-section on the line 7 7 of Fig. 5. Fig. 8 is a similar view on the line 8 8 of Fig. 5. Fig. 9 is a diagrammatic view showing how the tooth is turned to insert the same.

1 designates the saw-blade, which is provided with a plurality of dovetailed recesses 2 2 in its lower edge, which recesses 2 2 have their faces provided with deep semicircular tongues $2^a$ $2^a$ and $2^b$ of about one-eighth inch thick. The teeth 3 are of like form as the recesses 2, but smaller, to leave a space $2^\times$ between the top of the tooth and the top of the recess when the tooth is in place. The teeth 3 each have the side edges provided with deep semicircular grooves $3^a$ $3^a$ and a shallow groove $3^b$ on top of semicircular cross-section. The tops of the recess 2 are preferably cut slightly slanting from the center to the sides, as at $3^\times$ $3^\times$, for a purpose soon to be explained.

4 5 designate the wedge locking members, which are in practice of less length than one-half the width of the recess 2 to leave a space between them when they are in the locking position, as shown in Fig. 1. Each wedge 4 5 is of like form and is provided with a tongue $4^b$ $5^b$ on the lower edges to coöperate with the groove $3^b$ in the tooth, a groove $4^a$ $5^a$ on the ends to coöperate with the tongues $2^a$ $2^a$ of the recess 2 2, and a groove $4^c$ $5^c$ on the top edge to coöperate with the tongue $2^b$ of the recesses 2 2. The upper edge of each wedge is non-parallel with the lower edge, so that the wedges 4 and 5 may properly perform their functions. One wedge 5 has a countersunk portion $5^d$ to receive a leaf-spring 6, which is bolted or otherwise secured thereto, as at $6^a$ $6^a$. The other wedge 4 may have a spring to correspond to the spring 6 if found desirable, although I do not deem this necessary. Each wedge 4 and 5 has a transverse aperture $4^e$ $5^e$ to permit passage of a suitable bar or tool to knock against in driving the wedges into and out of position.

So far as described the manner in which my invention operates can best be explained as follows: The tooth is turned, as shown in Fig. 9, inserted into the recess 2, and allowed to drop into the position shown in Fig. 1, after which the wedge 4 is inserted and driven home by means of a suitable rod (not shown) which may be inserted in the aperture $4^e$ and hit with a hammer until the wedge is in place, when the rod is removed. The wedge 5 is then inserted in a like manner and likewise driven home. As the wedge 5 is driven home the spring 6 will spring into place and abut the back of the wedge 4, thus preventing the wedges working loose and toward one another.

By means of my present construction of saw I am enabled when it is not desirable to use all the teeth, as when I wish to saw a short stone, to remove all the teeth, except those which come in contact with the stone to be sawed. When several blades are being simultaneously used, as in stone-sawing machines when a short stone is to be sawed, the teeth used will be worn shorter than the ones removed, so I can take the short teeth from one blade and put them in the other blade, thus having a full set of teeth of same length, and the teeth first removed (the unworn ones) can be put into the other blade to make a full set, one blade having a full set of short (worn) teeth, while the other has a full set of long (unworn) teeth, as will be readily apparent to those skilled in the art to which my invention appertains.

My invention possesses many other novel features of construction over those saws now in common use, which will be readily apparent to those skilled in the art, and I therefore do not deem it necessary to dwell further thereon herein.

Having thus described my invention, what I claim, and desire to secure by Letters Patent, is—

1. A saw comprising a blade having recesses in its lower edge provided with tongues, teeth detachably held in said recesses and having grooves to coöperate with the blade-tongues, and wedges held in said recesses over the teeth and interlocking with the blade and teeth and with each other, substantially as shown and described.

2. A saw comprising a blade having recesses in its lower edge provided with tongues, teeth detachably held in said recesses and having grooves to coöperate with the blade-tongues, a plurality of wedges held in said recesses over the teeth and interlocking with the blade and teeth, and means coöperating between the wedges for holding the wedges in their tooth-locking positions.

3. A saw comprising in combination with a blade having recesses in its edge, of insertible teeth detachably held in said recesses; means carried by the blade and teeth for holding the teeth from lateral movement, a plurality of means inserted above the teeth in the recesses for holding the teeth from vertical movement, means for interlocking the last-named means with the teeth and blade to prevent such last-named means from lateral movement, and locking devices carried by the means inserted above the teeth and interlocking with each means for holding such means in their set positions, substantially as shown and described.

4. A saw comprising in combination with the blade having recesses in its edge, of insertible teeth adapted to be held in said recesses, said blade having tongues on the recess-faces, said teeth having corresponding grooves to coöperate therewith, a plurality of wedge devices insertible above the teeth and in the recesses and having grooves for coöperating with the blade-tongues, tongues for coöperating with the top tooth-grooves, and means carried by one of said wedge devices and engaging the other wedge device for holding said wedge devices from working loose, substantially as shown and described.

JAMES SYLVESTER YOUNG.

Witnesses:
CARLOS O. SPAULDING,
GUY WILSON.